J. C. FERGUSON, Jr.
SPECTACLE FRAME.
APPLICATION FILED DEC. 12, 1914.
1,147,712.
Patented July 27, 1915.
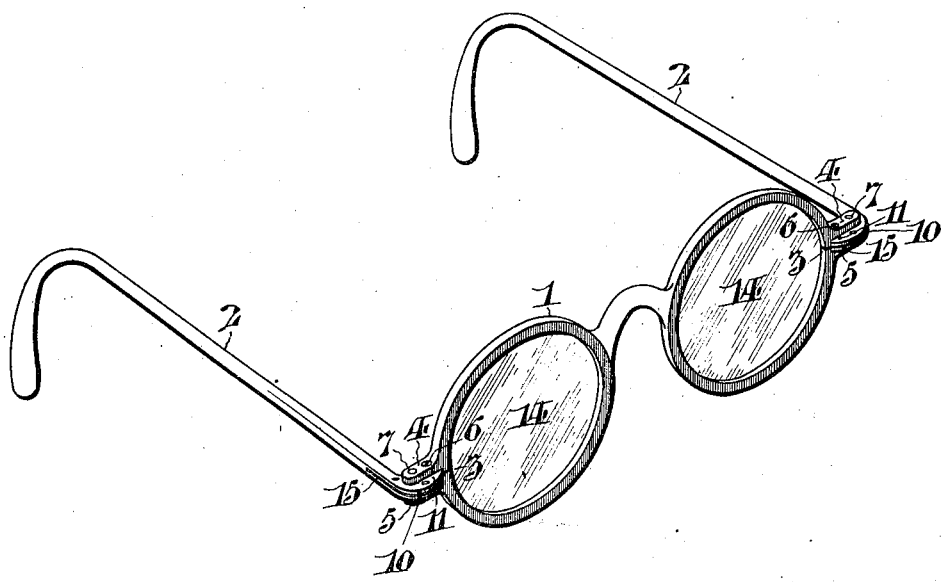
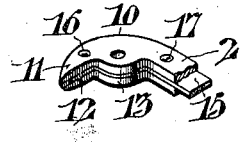
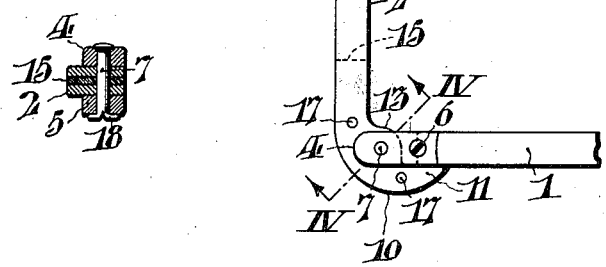
Inventor
Joseph C. Ferguson Jr.

UNITED STATES PATENT OFFICE.

JOSEPH C. FERGUSON, JR., OF PHILADELPHIA, PENNSYLVANIA.

SPECTACLE-FRAME.

1,147,712.  Specification of Letters Patent.  Patented July 27, 1915.

Application filed December 12, 1914. Serial No. 876,761.

*To all whom it may concern:*

Be it known that I, JOSEPH C. FERGUSON, Jr., of Philadelphia, in the county of Philadelphia and State of Pennsylvania, have invented certain new and useful Improvements in Spectacle-Frames, whereof the following is a specification, reference being had to the accompanying drawings.

In said drawings, Figure I, represents a view in perspective of a pair of spectacles embodying my invention. Fig. II, is a partial top or plan view showing the end of the hinged joint between the lens-carrying portion of the frame, and one of the rearwardly projecting ear-pieces. Fig. III, is a partial view in perspective showing the extremity of the ear-piece at the hinged end thereof, and Fig. IV, is a sectional view on the line IV, IV, of Fig. II.

My invention relates to spectacles whose frames are constructed of non-metallic material, such as tortoise shell, celluloid, or the like, and is intended to obviate certain difficulties which have been experienced in this class of frames.

In general practice it has been customary to make the lens-carrying portion of the frame solid throughout its entire contour, and to insert the lens by heating the material of the frame itself, so that it will expand or be capable of stretching, and then springing the lenses into position. This frequently results in cracking or injuring the lens and frames. On the other hand, if the lens frame be split at the ends, as is customary in ordinary spectacle frames, difficulty is experienced in applying the ear-pieces, owing to the fact that the split ends do not lend themselves to the usual method of attachment in such cases, and the fragile nature of the non-metallic ear-piece renders it exceedingly liable to break at the joint.

By my improvements I obviate these objections, and am enabled to construct a frame of non-metallic material, which will retain all the characteristic lightness sought for in this type of frame; which will permit the insertion of the lenses without difficulty; and which will afford a strong and secure joint for the ear-pieces.

Referring to the drawings, 1, indicates the lens-carrying frame and 2, 2, the ear pieces.

The frame is divided at each end, as shown at 3, and adjacent to each division a pair of projecting lugs 4, and 5, extend in the general plane of the frame, with a substantial interval between them, forming a socket which is adapted to receive the hinged end of the ear-piece. At a point close to the rounded portion of the frame a securing screw 6, is provided, by which the meeting edges at the opening 3, are clamped together in such manner as to securely hold the lens.

Near the outer extremity of the lugs 4, and 5, a pin 7, extends across the opening, and forms a pivotal hinge for the ear-piece 2.

The pivoted end of the ear-piece 2, has preferably the configuration clearly shown in the perspective view of Fig. III, that is to say, it comprises an external rounded end portion 10, which is laterally extended as shown at 11, so as to overlap the opening between the lugs 4, and 5, the internal surface of the overlapping portion being flat so as to afford an abrupt shoulder 12, which abuts against the front face of the frame when the ear-piece is swung outward to the open position which it occupies when the spectacles are worn.

On the inner side of the end of the ear-piece, an enlargement 13, is formed, in order to afford sufficient strength at the bearing through which the pivot 7, passes.

The entire extremity of the ear-piece is slit longitudinally to permit the insertion of a thin metallic strip 15, which preferably is co-extensive in cross section with the entire end portion of the ear-piece, a relatively thin layer of the non-metallic material thus covering each face of the metallic strip 15. Rivets 16 and 17, are located at appropriate points to firmly clamp the parts together.

With the device thus constructed, the lens 14, is readily inserted in position by springing the meeting edges of the frame apart, at the opening 3, after which the parts are clamped together by means of the screw 6, and the lens is held firmly in position. The ear-piece 2, is then pivotally secured by means of the pin 7, which has a head at one end, and is preferably split at the other, so that the projecting tips may be upset, as indicated at 18, in Fig. IV.

Having thus described my invention, I wish it to be understood that I do not claim broadly the use of projecting lugs at the split ends of a lens-frame, nor the employment of a pivoted ear-piece in connection therewith.

I claim:

In combination with a lens-frame formed of non-metallic material, said frame being divided at each end and having, adjacent to the meeting edges at the respective ends, a pair if lugs, with an interspace between their proximate faces; of an ear-piece of non-metallic material pivotally secured to said lugs, the end of said ear-piece being split at the region adjacent to the pivot; and a metallic plate seated in said split extremity, said plate being extended beyond the pivotal point and forming an abrupt shoulder adapted to bear against the front surface of the lens-frame, when the ear-piece is in its open position, substantially as set forth.

In testimony whereof, I have hereunto signed my name at Philadelphia, Pennsylvania, this tenth day of December, 1914.

JOSEPH C. FERGUSON, Jr.

Witnesses:
JAMES H. BELL,
E. L. FULLERTON.